US012676391B2

(12) United States Patent
Lee et al.

(10) Patent No.: US 12,676,391 B2
(45) Date of Patent: Jul. 7, 2026

(54) ELECTRODE ASSEMBLY, SECONDARY BATTERY AND METHOD FOR MANUFACTURING THE SAME

(71) Applicant: LG Energy Solution, Ltd., Seoul (KR)

(72) Inventors: Woo Yong Lee, Daejeon (KR); Dong Myung Kim, Daejeon (KR); Kyoung Won Kang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 882 days.

(21) Appl. No.: 17/776,064

(22) PCT Filed: Dec. 8, 2020

(86) PCT No.: PCT/KR2020/017874
§ 371 (c)(1),
(2) Date: May 11, 2022

(87) PCT Pub. No.: WO2021/118209
PCT Pub. Date: Jun. 17, 2021

(65) Prior Publication Data
US 2022/0384922 A1 Dec. 1, 2022

(30) Foreign Application Priority Data

Dec. 12, 2019 (KR) ........................ 10-2019-0165916

(51) Int. Cl.
*H01M 50/572* (2021.01)
*H01M 4/04* (2006.01)
(Continued)

(52) U.S. Cl.
CPC ........... *H01M 50/572* (2021.01); *H01M 4/62* (2013.01); *H01M 10/0413* (2013.01);
(Continued)

(58) Field of Classification Search
CPC . H01M 50/572; H01M 50/533; H01M 4/0404
See application file for complete search history.

(56) References Cited

U.S. PATENT DOCUMENTS

| | | | |
|---|---|---|---|
| 2014/0255778 A1 | 9/2014 | Huh et al. | |
| 2015/0162590 A1 | 6/2015 | Takahashi et al. | |
| (Continued) | | | |

FOREIGN PATENT DOCUMENTS

| | | |
|---|---|---|
| CN | 107548524 A | 1/2018 |
| CN | 208955123 U | 6/2019 |
| (Continued) | | |

OTHER PUBLICATIONS

International Search Report for PCT/KR2020/017874 dated Mar. 12, 2021. 3 pgs.
(Continued)

*Primary Examiner* — Jessie Walls-Murray
(74) *Attorney, Agent, or Firm* — Lerner David LLP

(57) ABSTRACT

The present disclosure relates to an electrode assembly. The electrode assembly can include a coating portion coated with an electrode active material and an electrode provided with an electrode tab without the electrode active material. The electrode can include a crack spreading prevention part, The crack spreading prevention part can include a crack spreading prevention hole formed in the electrode and an insulating coating layer provided on a circumferential surface of the crack spreading prevention hole.

8 Claims, 17 Drawing Sheets

(51) Int. Cl.

| | |
|---|---|
| *H01M 4/62* | (2006.01) |
| *H01M 10/04* | (2006.01) |
| *H01M 10/42* | (2006.01) |
| *H01M 50/172* | (2021.01) |
| *H01M 50/531* | (2021.01) |
| *H01M 50/533* | (2021.01) |
| *H01M 50/54* | (2021.01) |
| H01M 50/557 | (2021.01) |

(52) U.S. Cl.

CPC ..... *H01M 10/4235* (2013.01); *H01M 50/172* (2021.01); *H01M 50/531* (2021.01); *H01M 50/533* (2021.01); *H01M 50/54* (2021.01); *H01M 4/0404* (2013.01); *H01M 50/557* (2021.01); *H01M 2200/20* (2013.01)

(56) References Cited

U.S. PATENT DOCUMENTS

| | | | |
|---|---|---|---|
| 2015/0188100 A1* | 7/2015 | Isozaki | H01M 50/193 |
| | | | 429/181 |
| 2017/0214036 A1 | 7/2017 | Yang et al. | |
| 2018/0062148 A1 | 3/2018 | Cho et al. | |
| 2018/0102521 A1 | 4/2018 | Cho et al. | |
| 2018/0198106 A1 | 7/2018 | Takahashi et al. | |
| 2019/0088977 A1 | 3/2019 | Wakimoto et al. | |
| 2020/0251713 A1 | 8/2020 | Park et al. | |
| 2020/0321658 A1 | 10/2020 | Fukunaga et al. | |

FOREIGN PATENT DOCUMENTS

| | | | |
|---|---|---|---|
| JP | H11016577 A | 1/1999 |
| JP | 2004087300 A | 3/2004 |
| JP | 2010165495 A | 7/2010 |
| JP | 2014179217 A | 9/2014 |
| JP | 2019057430 A | 4/2019 |
| JP | 2019-102361 A | 6/2019 |
| JP | 2019-536223 A | 12/2019 |
| KR | 20010087982 A | 9/2001 |
| KR | 100338443 B1 | 6/2002 |
| KR | 100861716 B1 | 10/2008 |
| KR | 20120080391 A | 7/2012 |
| KR | 20120134341 A | 12/2012 |
| KR | 20130050654 A | 5/2013 |
| KR | 20140112609 A | 9/2014 |
| KR | 20150066466 A | 6/2015 |
| KR | 20150076101 A | 7/2015 |
| KR | 20160092748 A | 8/2016 |
| KR | 20160132566 A | 11/2016 |
| KR | 20180085144 A | 7/2018 |
| KR | 20190030973 A | 3/2019 |
| WO | 2016178539 A1 | 11/2016 |
| WO | 2017-204184 A1 | 11/2017 |

OTHER PUBLICATIONS

Search Report dated Jul. 26, 2023 from Office Action for Chinese Application No. 2020800775564 issued Jul. 29, 2023. 3 pgs.

* cited by examiner

[Maximum stress generation position of round portion
and hold portion]

[Maximum stress generation position of round portion
and hold portion]

[Maximum stress generation position of round portion and hold portion]

[Nonexistence of insulating coating layer]

[Existence of insulating coating layer]

[Nonexistence of insulating coating layer]

[Existence of insulating coating layer]

[Hole circular shape ]

[Hole elliptical shape]

ELECTRODE ASSEMBLY, SECONDARY BATTERY AND METHOD FOR MANUFACTURING THE SAME

CROSS-REFERENCE TO RELATED APPLICATIONS

The present application is a national phase entry under 35 U.S.C. § 371 of International Application No. PCT/KR2020/017874 filed on Dec. 8, 2020, which claims the benefit of the priority of Korean Patent Application No. 10-2019-0165916, filed on Dec. 12, 2019, all of which are herein incorporated by reference in their entirety.

TECHNICAL FIELD

The present invention relates to an electrode assembly, in which disconnection of an electrode tab is suppressed, a secondary battery and a method for manufacturing the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can-type secondary battery, in which an electrode assembly is embedded in a metal can, and a pouch-type secondary battery in which an electrode assembly is embedded in a pouch.

The pouch-type secondary battery comprises an electrode assembly, an electrode lead coupled to the electrode assembly, and a pouch accommodating the electrode assembly in a state in which a front end of the electrode lead is drawn out to the outside, and the electrode assembly has a structure in which electrodes and separators are alternately stacked. In addition, the electrode comprises a coating portion coated with an electrode active material and an electrode tab portion without the electrode active material.

However, the pouch-type secondary battery has a problem in that cracks occur in an interface between the coating portion and the electrode tab portion, which are provided in the electrode, and thus the coating portion and the electrode tab portion are disconnected from each other. That is, the electrode lead is fixed to the pouch, and the electrode tab portion is fixed to the electrode assembly so that the electrode tab portion is in a state in which tension is applied. In such a state, when the electrode assembly moves due to external force, there is a problem in that the cracks occur in the interface between the coating portion and the electrode tab portion, which are provided in the electrode, and thus, the coating portion and the electrode tab portion are disconnected from each other.

DISCLOSURE OF THE INVENTION

Technical Problem

The present invention is invented to solve the above problems, and an object of the present invention is to provide an electrode assembly, which comprises a crack prevention part on an interface between a coating portion and an electrode tab portion, which are provided in an electrode, to prevent cracks from occurring in the interface between the coating portion and the electrode tab portion and prevent the cracks from being spread even though the cracks occur, thereby preventing the electrode tab part from being disconnected so as to improve safety, a secondary battery and a method for manufacturing the same.

Technical Solution

An electrode assembly according to the present invention comprises a coating portion coated with an electrode active material and an electrode provided with an electrode tab without the electrode active material, wherein the electrode comprises a crack spreading prevention part, wherein the crack spreading prevention part comprises a crack spreading prevention hole formed in the electrode and an insulating coating layer provided on a circumferential surface of the crack spreading prevention hole.

The crack spreading prevention hole may be formed in an interface between the coating portion and the electrode tab, which are provided in the electrode.

The insulating coating layer may comprise an inner coating portion provided on an inner circumferential surface of the crack spreading prevention hole and an outer coating portion, which is integrally connected to the inner coating portion and is provided on top and bottom surfaces of the crack spreading prevention hole.

An outer surface of the outer coating portion may have a gear shape in which grooves and protrusions are alternately formed.

The insulating coating layer may have a thickness of 10 $\mu$m to 15 $\mu$m, and the outer coating portion may have a thickness greater than that of the inner coating portion.

A round portion may be formed at each of both ends of an interface between the coating portion and the electrode tab, and the crack spreading prevention hole may be disposed at a point that is spaced a distance of 2.0 mm to 5.0 mm from a round portion at which each of the ends of the interface is disposed.

The crack spreading prevention part may further comprise a reinforcing coating layer that is applied on an interface between the coating portion and the electrode tab and is connected to the insulating coating layer.

The crack spreading prevention hole may have a circular or elliptical shape with a size of 0.5 mm to 2.0 mm.

A secondary battery according to the present invention comprises: an electrode assembly; an electrode lead coupled to an electrode tab of the electrode assembly; and a battery case configured to accommodate the electrode assembly in a state in which an end of the electrode lead is pulled out to the outside.

A method for manufacturing a secondary battery according to the present invention comprises: a step (a) of preparing an electrode comprising a coating portion coated with an electrode active material and an electrode tab having no electrode active material; a step (b) of manufacturing a crack spreading prevention part for preventing cracks from being spread in the electrode; a step (c) of alternately stacking the electrode and a separator to manufacture an electrode assembly; a step (d) of coupling an electrode lead to the electrode tab of the electrode provided in the electrode assembly; and a step (e) of accommodating the electrode assembly in a battery case in a state in which an end of the electrode lead is pulled out to the outside, wherein, in the step (b), the crack spreading prevention part is provided on an interface between the coating portion and the electrode tab, which are provided in the electrode.

The step (b) may be performed to manufacture the crack spreading prevention part through a process of punching a crack spreading prevention hole for preventing cracks from being spread in the interface between the coating portion and the electrode tab and a process of applying an insulating coating layer to surround an inner circumferential surface of the crack spreading prevention hole.

A round portion may be formed at each of both ends of the interface between the coating portion and the electrode tab, and the crack spreading prevention hole may be disposed with a size of 0.5 mm to 2 mm at a point that is spaced a distance of 2.0 mm to 5.0 mm from a round portion at which each of the ends of the interface is disposed.

The step (b) may further comprise a process of pressing top and bottom surfaces of the electrode, on which the insulating coating layer is disposed, at the same time to bond the insulating coating layer to the electrode The step (b) may further comprise, after manufacturing the insulating coating layer on the electrode, a process of applying a reinforcing coating layer along the interface between the coating portion and the electrode tab.

Advantageous Effects

The electrode assembly according to the present invention may comprise the crack spreading prevention part in the electrode, and the crack spreading prevention part may comprise the crack spreading prevention hole and the insulating coating layer. Due to this feature, the cracks may be prevented from occurring in the electrode, and even though the cracks occur, the cracks may be prevented from being spread to prevent the electrode from being disconnected, thereby improving the safety. Particularly, the electrode assembly according to the present invention may comprise the insulating coating layer that protects the crack spreading prevention hole to stably maintain the outer appearance of the crack spreading prevention hole, thereby stably preventing the cracks from occurring and being spread.

In addition, in the electrode assembly according to the present invention, the crack spreading prevention hole may be formed in the interface between the coating portion and the electrode tab, which are provided in the electrode. That is, the possibility of occurrence of the cracking may be high in the interface between the coating portion and the electrode tab, which are provided in the electrode, and thus, the crack spreading prevention hole may be formed in the interface between the coating portion and the electrode tab to prevent the disconnection between the coating portion and the electrode tab from occurring.

Also, in the electrode assembly according to the present invention, the insulating coating layer may comprise the inner coating portion and the outer coating portion. Due to this feature, both the inner and outer surfaces of the crack spreading prevention hole may be protected, and in particular, the outer appearance of the crack spreading prevention hole may be stably maintained.

In addition, in the electrode assembly according to the present invention, the outer surface of the outer coating portion may have the gear shape in which the grooves and the protrusions are alternately formed. Due to this feature, the cracks occurring between the coating portion and the electrode tab may be induced to be introduced into the groove formed outside the outer coating portion, and thus, the crack introduced into the groove of the outer coating portion may be no longer spread to prevent the cracks from being spread.

In addition, in the electrode assembly according to the present invention, the outer coating portion may have the thickness greater than that of the inner coating portion. Due to this feature, the crack spreading prevention hole may be stably protected from the external impact, and the outer appearance of the crack spreading prevention hole may be stably maintained.

In addition, in the electrode assembly according to the present invention, the crack spreading prevention hole may be formed at the position that is spaced a distance of 2.0 mm to 5.0 mm from the round portion disposed at the end of the interface formed between the coating portion and the electrode tab. Due to this feature, the weakening of the strength between the coating portion and the electrode tab may be minimized by the crack spreading prevention hole, and thus, the spreading of the cracks occurring in the round portion between the coating portion and the electrode tab may be quickly blocked.

In addition, the electrode assembly according to the present invention may comprise the reinforcing coating layer applied on the interface between the coating portion and the electrode tab. Due to this feature, the strength of the interface between the coating portion and the electrode tab may be reinforced, and thus, the occurrence of the cracks may be prevented.

MODE FOR CARRYING OUT THE INVENTION

Figure 1:
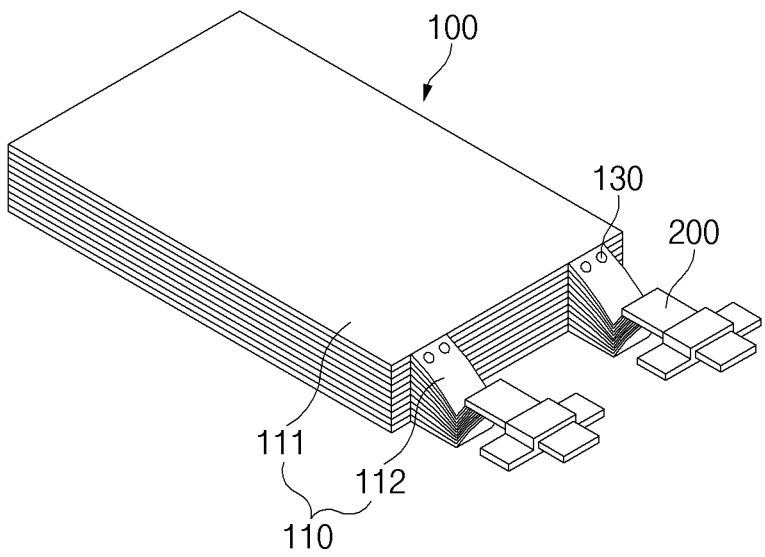
FIG. 1 is a perspective view of an electrode assembly according to a first embodiment of the present invention.
Figure 2:
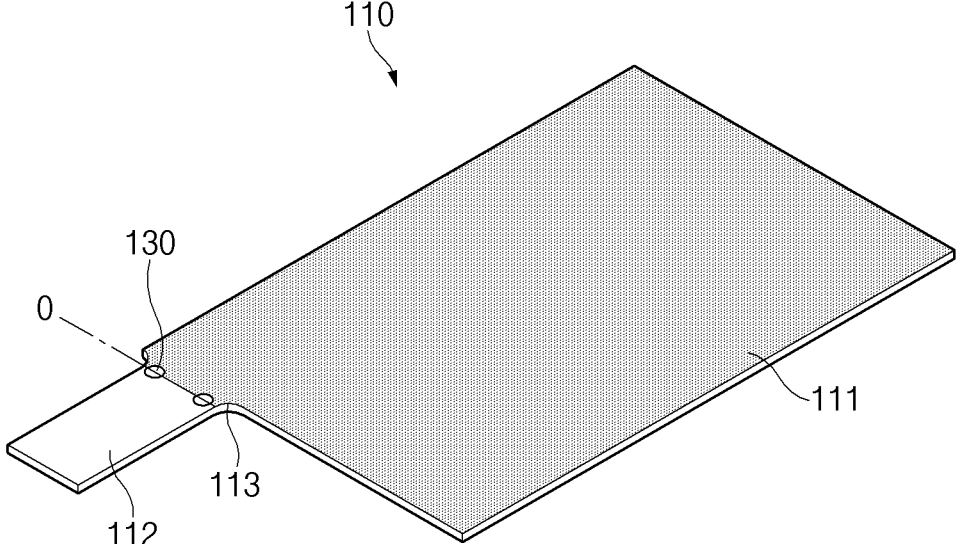
FIG. 2 is a perspective view illustrating an electrode of the electrode assembly of FIG. 1.
Figure 3:
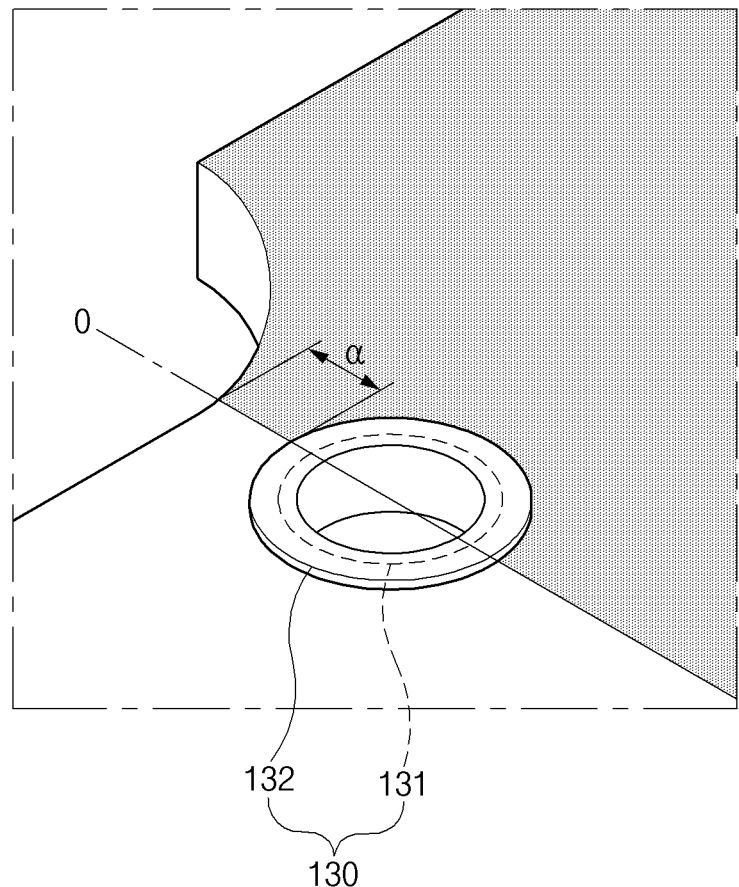
FIG. 3 is a partially enlarged view of the electrode of FIG. 2.
Figure 4:
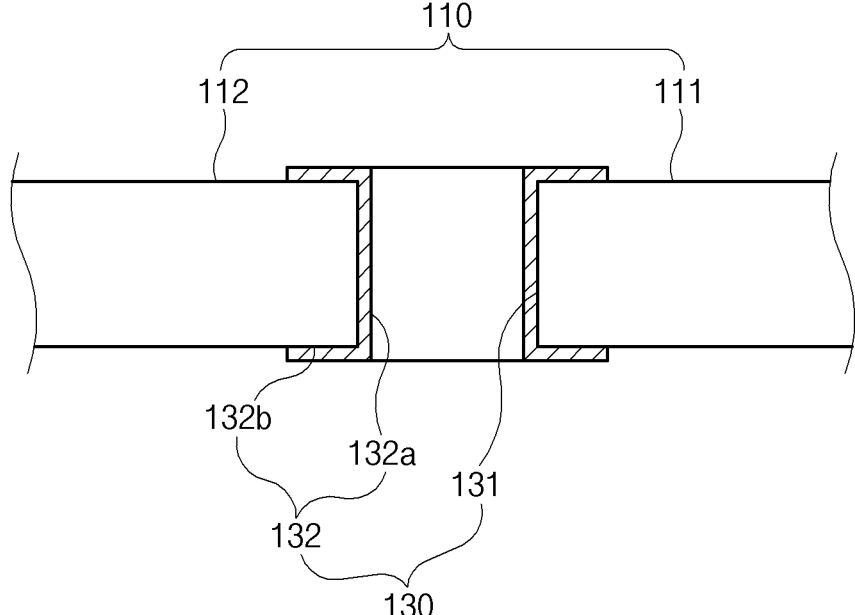
FIG. 4 is a cross-sectional view of the electrode of FIG. 2.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly According to First Embodiment of the Present Invention]

An electrode assembly according to a first embodiment of the present invention has a structure comprising a crack spreading prevention part, and thus, an occurrence of cracks in the electrode assembly may be suppressed, and even though the cracks occur, the cracks may be prevented from being spread to prevent a disconnection accident from occurring.

That is, as illustrated in FIGS. 1 to 4, the electrode assembly 100 according to the first embodiment of the present invention has a structure in which a plurality of electrodes 110 with a separator therebetween are alternately stacked. Each of the electrodes 110 comprises a coating portion 111 coated with an electrode active material and an electrode tab 112 connected to one surface of the coating portion 111, having a width less than that of the coating portion 111, and provided without the electrode active material. Also, a round portion 113 is formed at each of both ends between the coating portion 111 and the electrode tab 112 to prevent cracks from occurring. The plurality of electrodes 110 may be a positive electrode and a negative electrode, and the positive electrode and the negative electrode are alternately stacked with a separator therebetween.

Each of the electrodes 110 comprises a crack spreading prevention part 130 for preventing cracks from being spread in a surface having high probability of occurrence of the cracks, and the crack spreading prevention part 130 reduces effective stress generated in the electrode 110 to suppress the occurrence of the cracks and also prevent the cracks occurring in the electrode 110 from being spread, thereby preventing disconnection of the electrode.

For example, the crack spreading prevention part 130 comprises a crack spreading prevention hole 131 formed in the electrode 110 and an insulating coating layer 132 provided on an inner circumferential surface of the crack spreading prevention hole 131. Particularly, the crack spreading prevention hole 131 is formed in an interface O between the coating portion 111 and the electrode tab 112, which are provided in the electrode 110.

That is, the interface O between the coating portion 111 and the electrode tab 112, which are provided in the electrode 110, may be easily cracked due to external impacts, and thus, the coating portion 111 and the electrode tab 112 may be disconnected from each other due to the cracks. In order to prevent the disconnection, in the present application, the crack spreading prevention hole is formed in the interface O between the coating portion 111 and the electrode tab 112, and the insulating coating layer 132 for reinforcing the strength of the crack spreading prevention hole 131 is provided.

Thus, the crack spreading prevention part 130 may block the spreading of the cracks occurring in the interface O between the coating portion 111 and the electrode tab 112 through the crack spreading prevention hole 131 to prevent the cracks from being spread. Particularly, the cracks may occur in the crack spreading prevention hole 131 due to external force, but the inner circumferential surface of the crack spreading prevention hole 131 may be protected through the insulating coating layer 132 to prevent cracks from occurring in the crack spreading prevention hole 131. Particularly, the insulating coating layer 132 may reinforce the strength of the interface O between the coating portion 111 and the electrode tab 112, and thus, the interface O between the coating portion 111 and the electrode tab 112 may be prevented from being deformed to significantly reduce possibility of occurrence of the cracks.

The insulating coating layer 132 comprises an inner coating portion 132a provided on the inner circumferential surface of the crack spreading prevention hole 131 and an outer coating portion 132b integrally connected to the inner coating portion 132a and provided on outer top and bottom surfaces of the crack spreading prevention hole 131.

Thus, the insulating coating layer 132 may protect both the inner circumferential surface and the outer surface of the crack spreading prevention hole 131 to effectively reinforce the strength of the crack spreading prevention hole 131, in particular, significantly prevent the cracks from occurring in the crack spreading prevention hole 131.

The insulating coating layer 132 has a thickness of 10 μm to 15 μm, but the outer coating portion 132b has a thickness greater than that of the inner coating portion 132a. That is, the cracks occur due to deformation such as torsion of the electrode, and thus, the outer coating portion 132b applied on the outer surface of the crack spreading prevention hole 131 is formed to have a large thickness to significantly increase in strength of the outer circumferential surface of the crack spreading prevention hole 131, thereby preventing the crack spreading prevention hole 131 from being deformed. Since the inner coating portion 132a is configured to reinforce insulation of the crack spreading prevention hole 131, the inner coating portion 132a may have a thickness less than that of the outer coating portion 132b and thus be reduced in cost.

The crack spreading prevention hole 131 is provided at a point that is spaced a predetermined distance a from the round portion 113 formed at each of both ends of the interface O between the coating portion 111 and the electrode tab 112. That is, the crack spreading prevention hole 131 is provided at a point that is spaced a distance of 2.0 to 5.0 mm from the round portion 113 at which each of ends of the interface O is disposed. That is, when the position of the crack spreading prevention hole 131 is defined at a point that is spaced a distance of 2.0 mm or less from the round portion 113, there is a problem in that a portion between the round portion 113 and the crack spreading prevention hole 131 is easily cut due to weak strength of the round portion 113. Also, when the position of the crack spreading prevention hole 131 is defined at a point that is spaced a distance of 5.0 mm or more from the round portion 113, there is a problem in that an occurrence of irregular cracks occurring in the round portion 113 is not blocked. Therefore, the crack spreading prevention hole 131 is provided at a point that is spaced a distance of 2.0 to 5.0 mm from the round portion 113 at which each of the ends of the interface O is disposed, and thus, the strength between the round portion 113 and the crack spreading prevention hole 131 may be prevented from being weakened, and also, the occurrence of the irregular cracks occurring in the round portion 113 may be stably blocked.

The crack spreading prevention hole 131 may be formed in a circular shape having a size of 0.5 mm to 2.0 mm. Thus, the occurrence of even the irregular cracks occurring in the round portion 113 may be stably blocked.

Therefore, the electrode assembly 100 according to the present invention may comprise the crack spreading prevention part 130 to suppress the occurrence of the cracks in the electrode and to block the spreading of the cracks even though the cracks occur, thereby preventing a disconnection accident.

Hereinafter, in descriptions of another embodiment of the present invention, constituents having the same function as the above-mentioned embodiment have been given the same reference numeral in the drawings, and thus duplicated description will be omitted.

[Secondary Battery According to Second Embodiment of the Present Invention]

Figure 5:
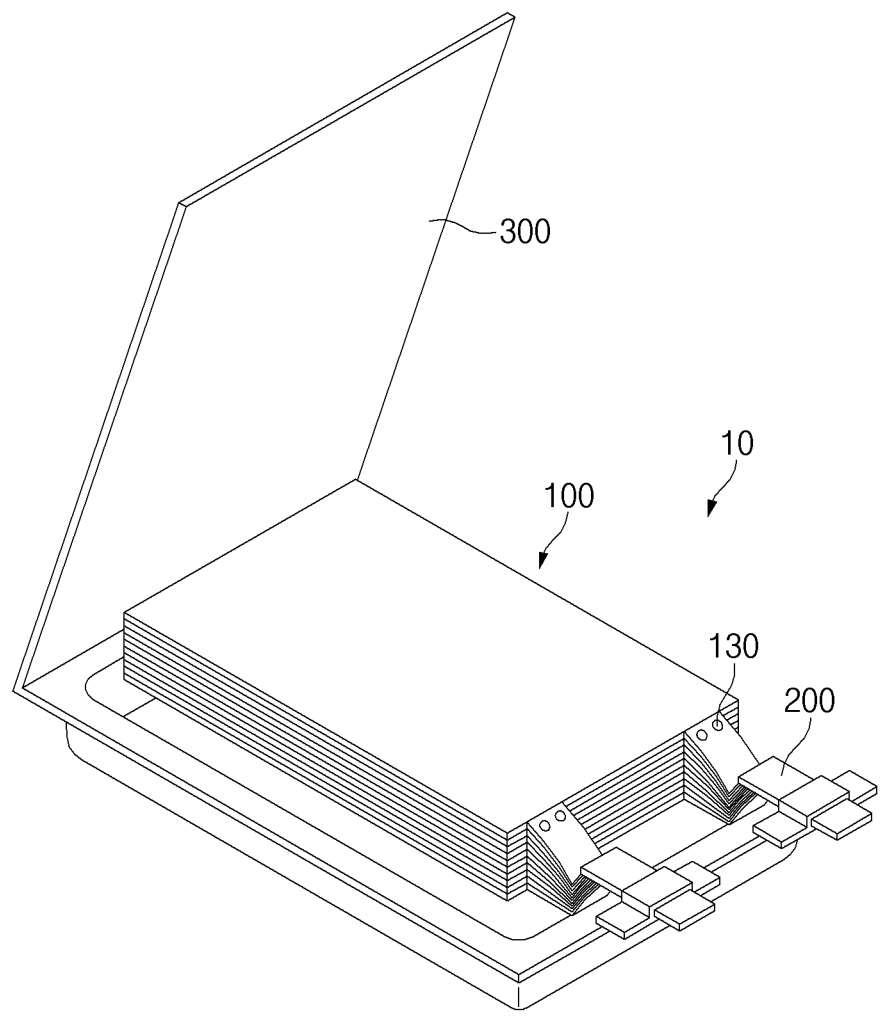
FIG. 5 is a perspective view of a secondary battery according to a second embodiment of the present invention.

As illustrated in FIG. 5, a secondary battery 10 according to a second embodiment of the present invention comprises an electrode assembly 100, an electrode lead 200 coupled to an electrode tab 112 of the electrode assembly 100, and a battery case 300 accommodating the electrode assembly 100 in a state in which an end of the electrode lead 200 is pulled out to the outside.

In the secondary battery, since the electrode lead is coupled to the battery case, if the electrode assembly accommodated in the battery case moves up and down or left and right, the electrode tab disposed between the electrode lead and the electrode assembly may be deformed (for example, torsion). Here, there is a problem in that cracks occur in an interface having weak strength between a coating portion and an electrode tab of an electrode, and thus, a portion between the coating portion and the electrode tab is cut due to spreading of the cracks.

In order to solve the above problems, the secondary battery 10 according to the second embodiment of the present invention comprises a crack spreading prevention part, which prevents the cracks occurring in the electrode provided in the electrode assembly from being spread, to improve safety through the crack spreading prevention part.

For example, the electrode assembly 100 of the secondary battery 10 according to the second embodiment of the present invention has a structure in which a plurality of electrodes 110 with a separator therebetween are alternately stacked. Each of the electrodes 110 comprises a coating portion 111 coated with an electrode active material and an electrode tab 112 which is connected to one surface of the coating portion 111, has a width less than that of the coating portion 111, and is provided without the electrode active material. Also, a round portion 113 is formed at each of both ends between the coating portion 111 and the electrode tab 112 to prevent cracks from occurring.

Here, the electrode 110 may comprise a crack spreading prevention part 130 at an interface O between the coating portion 111 and the electrode tab 112, and the crack spreading prevention part 130 may block propagation of the cracks occurring in the interface O of the electrode to prevent the crack from being spread, thereby preventing the electrode from being disconnected.

The electrode assembly 100 has the same configuration and function as the electrode assembly described in the first embodiment, and accordingly, duplicate descriptions will be omitted.

Therefore, the secondary battery 10 according to the second embodiment of the present invention may block the spreading of the cracks occurring in the electrode 110 to prevent the electrode from being disconnected.

Hereinafter, a method for manufacturing the secondary battery according to the second embodiment of the present invention will be described.

[Method for Manufacturing Secondary Battery According to Second Embodiment of the Present Invention]

Figure 6:
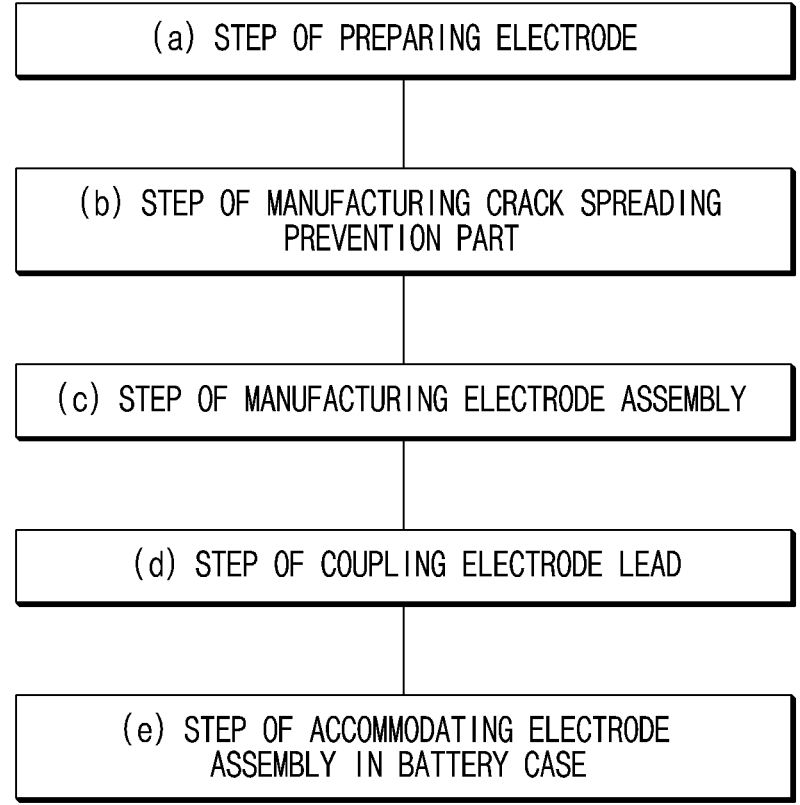
FIG. 6 is a flowchart illustrating a method for manufacturing the second battery of FIG. 5.
Figure 7:
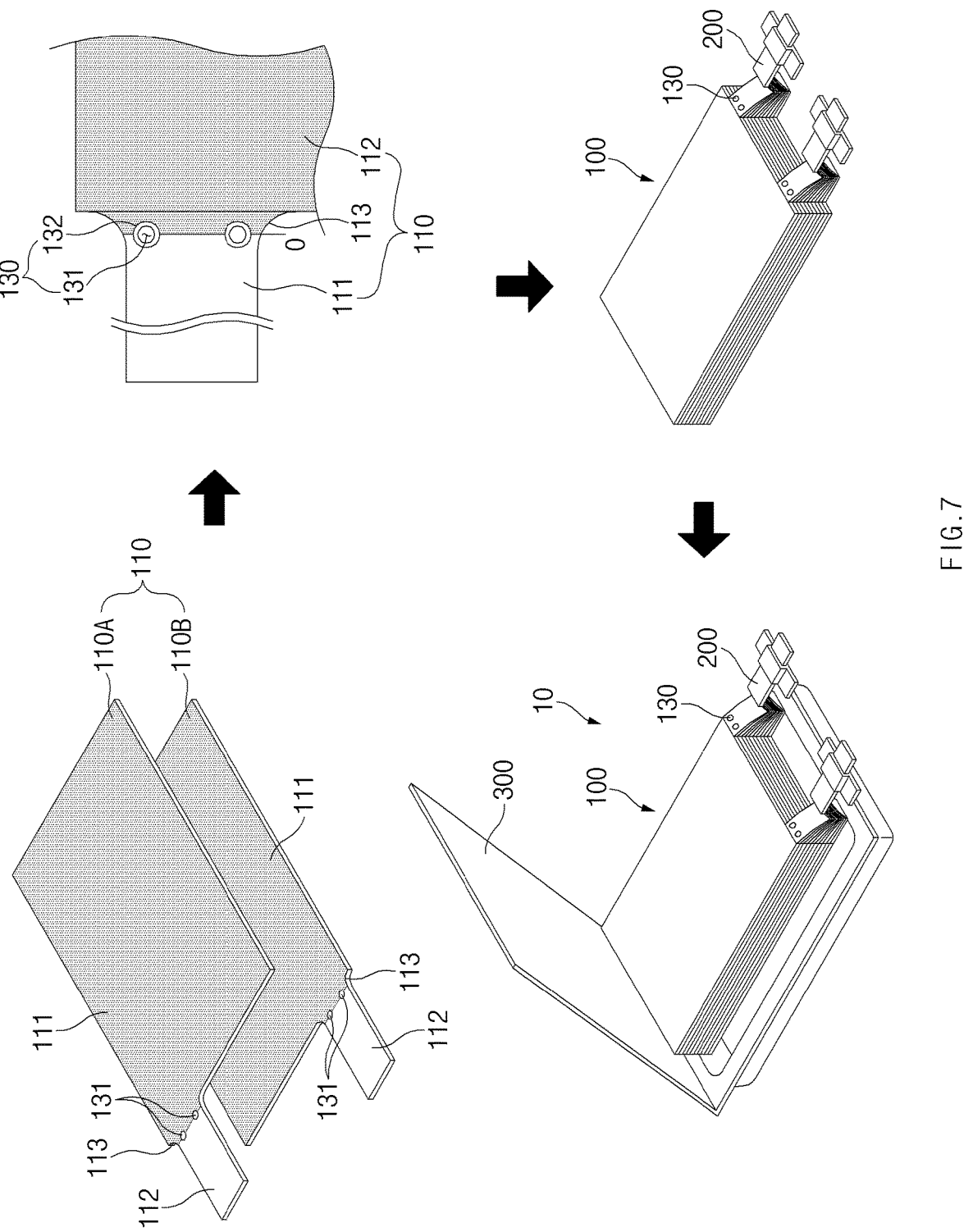
FIG. 7 is a process view illustrating the method for manufacturing the second battery of FIG. 6.

As illustrated in FIGS. 6 and 7, a method for manufacturing the secondary battery according to the second embodiment of the present invention comprises a step (a) of preparing an electrode comprising a coating portion coated with an electrode active material and an electrode tab having no electrode active material, a step (b) of manufacturing a crack spreading prevention part for preventing cracks from being spread in the electrode, a step (c) of alternately stacking the electrode and a separator to manufacture an electrode assembly, a step (d) of coupling an electrode lead to the electrode tab of the electrode provided in the electrode assembly, and a step (e) of accommodating the electrode assembly in a battery case in a state in which an end of the electrode lead is pulled out to the outside.

Step (a)

The step (a) is performed to prepare the electrode, and a collector having a non-coating portion formed on one surface thereof is prepared. Here, a connected portion between the non-coating portion and the collector is formed as a round portion 113. Next, the electrode active material is applied on a surface of the collector except for the non-coating portion. Thus, an electrode 110 comprising a coating portion 111 coated with an electrode active material and an electrode tab 112 that is a non-coating portion without the electrode active material may be manufactured. In the electrode 110, a stepped portion (a stepped portion formed by a thickness of the electrode active material) is formed between the coating portion 111 and the electrode tab 112 to form an interface O.

The electrode 110 may comprise a first electrode 110A and a second electrode 110B. Here, the first electrode 110A may be a positive electrode, and the second electrode 110B may be a negative electrode.

Step (b)

The step (b) is performed to manufacture a crack spreading prevention part and comprises a process of punching a crack spreading prevention hole 131 for preventing cracks from being spread in the interface O between the coating portion 111 and the electrode tab 112 and a process of applying an insulating coating material to surround an inner circumferential surface of the crack spreading prevention hole 131 so as to form an insulating coating layer 132. As a result, the crack spreading prevention part 130 comprising the crack spreading prevention hole 131 and the insulating coating layer 132 may be manufactured through the above-described processes.

Particularly, the crack spreading prevention part 130 is provided on the interface O between the coating portion 131 and the electrode tab 112, which is provided in the electrode 110. Here, the cracks may easily occur in the interface O due to deformation.

The crack spreading prevention part 130 is disposed at a position that is spaced a predetermined interval from the round portion formed at each of both ends of the interface O between the coating portion 111 and the electrode tab 112. For example, the crack spreading prevention hole 131 of the crack spreading prevention part 130 is formed with a size of 0.5 mm to 2 mm at a point that is spaced a distance of 2.0 mm to 5.0 mm from the round portion 113 at which the end of the interface O is disposed.

The step (b) further comprises a process of pressing top and bottom surfaces of the electrode 110, on which the insulating coating layer 132 is disposed, at the same time to bond the insulating coating layer 132 to the electrode 110. As a result, bonding force between the electrode 110 and the crack spreading prevention part 130 may be improved.

Figure 10:
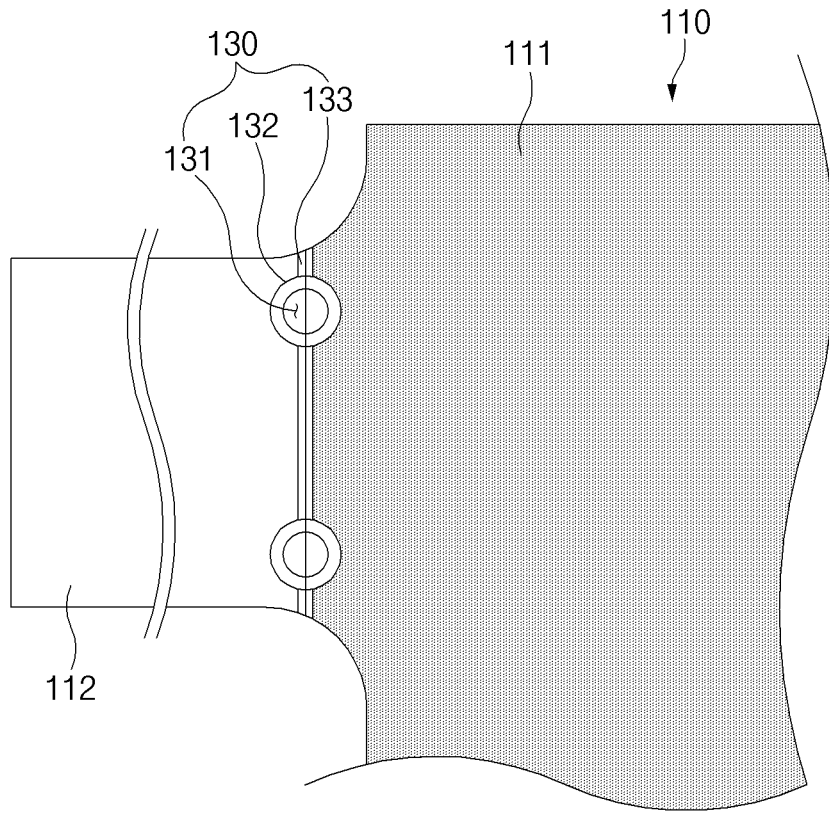
FIG. 10 is a partial plan view of an electrode assembly according to a fifth embodiment of the present invention.

Referring to FIG. 10, the step (b) further comprises, after manufacturing the insulating coating layer 132 on the electrode, a process of applying a reinforcing coating layer 133 along the interface between the coating portion and the electrode tab. Thus, strength of the electrode disposed at the interface O may be significantly reinforced, and in particular, the stepped portion formed at the interface O may be removed to prevent the separator facing the electrode from being damaged.

Step (c)

The step (c) is performed to manufacture the electrode assembly, and the electrode 110 and the separator are alternately stacked to manufacture the electrode assembly 100.

Step (d)

The step (d) is performed to manufacture a secondary battery. An electrode lead is coupled to an end of the electrode tab 112 provided in the electrode assembly 100, and the electrode assembly 100 is accommodated in a battery case 300 in a state in which the end of the electrode lead 200 is pulled out to the outside to manufacture a finished secondary battery 10.

[Electrode Assembly According to Third Embodiment of the Present Invention]

Figure 8:
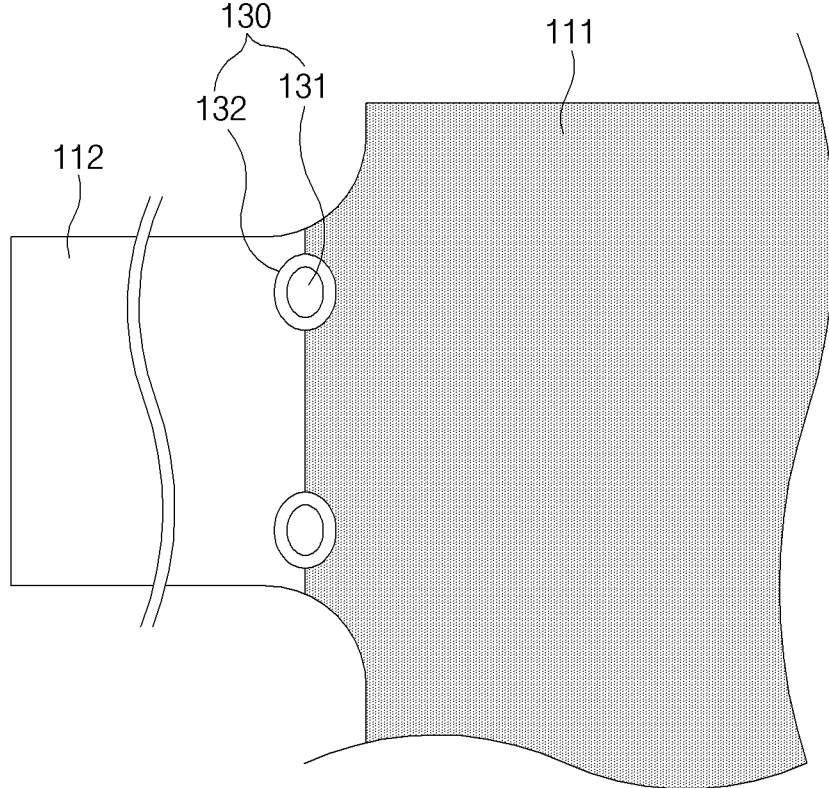
FIG. 8 is a partial plan view of an electrode assembly according to a third embodiment of the present invention.

As illustrated in FIG. 8, an electrode assembly 100 according to a third embodiment of the present invention comprises a crack spreading prevention part 130 comprising a crack spreading prevention hole 131 and an insulating coating layer 132.

Here, the crack spreading prevention hole 131 is provided in an elliptical shape at an interface O between a coating portion 111 and an electrode tab 112. Of course, the insulating coating layer 132 is also provided in an elliptical shape.

Therefore, the crack spreading prevention part 130 of the electrode assembly 100 according to the third embodiment of the present invention may effectively block spreading of cracks occurring at the interface O between the coating portion 111 and the electrode tab 112.

The crack spreading prevention hole 131 may be provided in a geometric shape that is connected only by a curve. Thus, the shape of the crack spreading prevention hole is adjusted to correspond to the interface O between the coating portion 111 and the electrode tab 112.

[Electrode Assembly According to Fourth Embodiment of the Present Invention]

Figure 9:
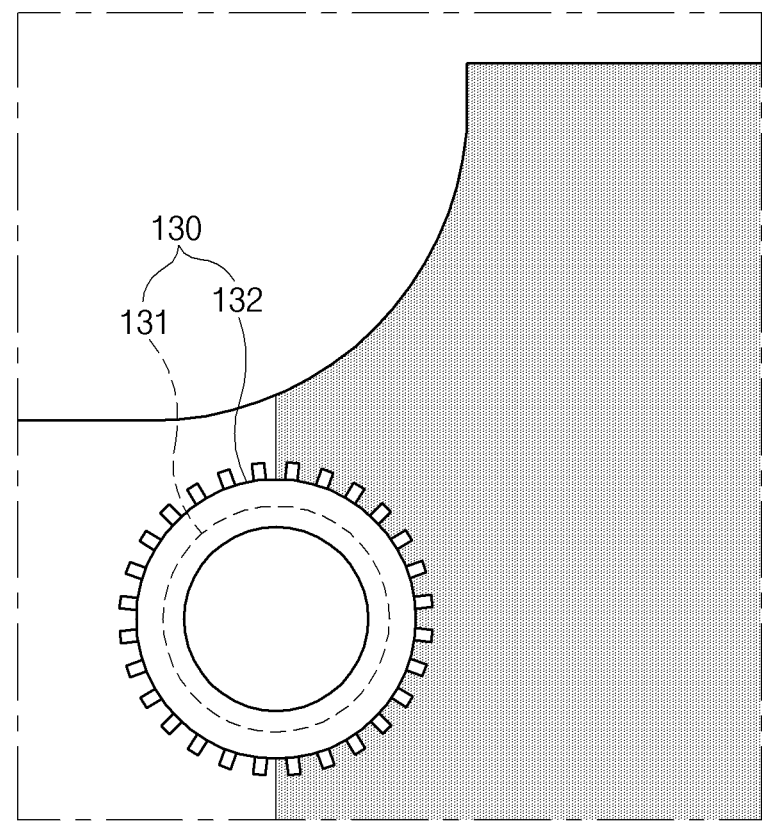
FIG. 9 is a partial plan view of an electrode assembly according to a fourth embodiment of the present invention.

As illustrated in FIG. 9, an electrode assembly 100 according to a fourth embodiment of the present invention comprises a crack spreading prevention part 130 comprising a crack spreading prevention hole 131 and an insulating coating layer 132, and the insulating coating layer 132 comprises an inner coating portion 132a and an outer coating portion 132b.

Here, an outer surface of the outer coating portion 132b has a gear shape in which grooves and protrusions are alternately formed. That is, when the cracks occurring in the interface O between the coating portion 111 and the electrode tab 112 are introduced into the grooves formed outside the outer coating portion 132b, the crack spreading prevention part 130 may block spreading of the cracks so that the cracks are spread to the outside of the outer coating portion.

Therefore, in the electrode assembly 100 according to the fourth embodiment of the present invention, the spreading of the cracks occurring in the electrode may be significantly prevented.

[Electrode Assembly According to Fifth Embodiment of the Present Invention]

As illustrated in FIG. 10, an electrode assembly 100 according to a fifth embodiment of the present invention comprises a crack spreading prevention part 130 comprising a crack spreading prevention hole 131 and an insulating coating layer 132.

Here, the crack spreading prevention part 130 further comprises a reinforcing coating layer 133, which is applied on an interface O between a coating portion 111 and an electrode tab 112 and is connected to the insulating coating layer 132.

The reinforcing coating layer 133 may be made of the same material as the insulating coating layer 132. For example, the reinforcing coating layer 133 may be made of styrene-butadiene rubber (SBR) or ceramic matrix composite (CMC) to minimize reaction with an electrolyte inside a secondary battery and to prevent the reinforcing coating 133 from being delaminated from the electrode tab during charging and discharging.

Therefore, the electrode assembly according to the fifth embodiment of the present invention may reinforce strength of the interface O between the coating portion 111 and the electrode tab 112 to prevent cracks from occurring, and in particular, may remove a stepped portion between the coating portion and the electrode tab to prevent a separator facing the electrode from being damaged.

EXPERIMENTAL EXAMPLE

Experimental Example 1

A secondary battery comprising an electrode assembly, an electrode lead, and a battery case is prepared. At this time, the electrode assembly comprises an electrode and a separator, the electrode comprises a coating portion and an electrode tab, and the electrode lead is coupled to the electrode tab. Here, a crack spreading prevention hole is provided at an interface between the coating portion and the electrode tab to prevent cracks from being spread.

That is, in Experimental Example 1, a structure, in which an insulating coating layer is excluded from the secondary battery described according to the second embodiment of the present invention, is provided.

At this time, in Experimental Example 1, a plurality of secondary batteries, in which the crack spreading prevention holes have different diameters, are prepared, and then, tension is applied to the electrode tab of each of the secondary batteries in an X-axis direction that is a width direction, or the tension is applied in a Y-axis direction that is a longitudinal direction to experiment a generation of stress. As a result, the same results as in FIGS. 11(a) and 11(b) may be obtained.

Experimental Results of Experimental Example 1

Figure 11A:
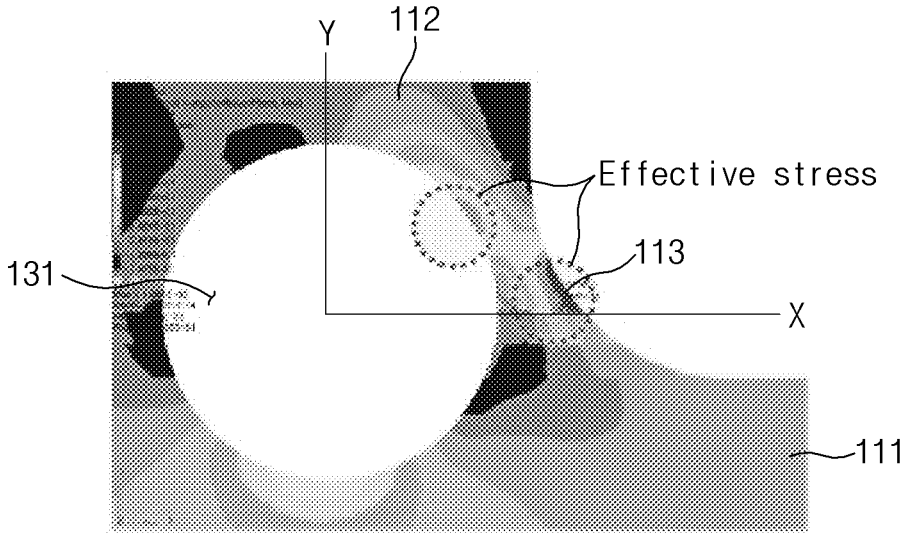
FIG. 11(a) is a first effective stress distribution image and a first effective stress graph illustrating experimental results of Experimental Example 1 according to the present invention.
Figure 11A:
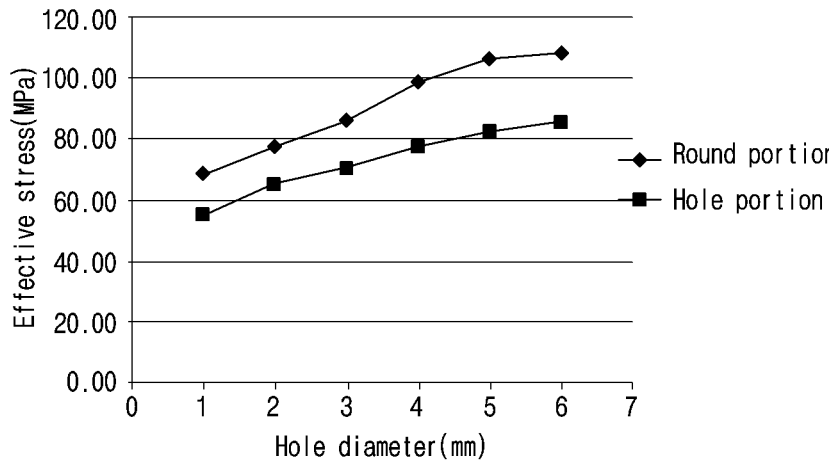

Referring to FIG. 11(a), as a result of applying the tension to the electrode tab 112 of the secondary battery in the X-axis direction, effective stress is generated in a round portion 113 and a crack spreading prevention hole 131. In this case, it is seen that as the diameter of the crack spreading prevention hole 131 increases, the effective stress increases due to a decrease in effective tension area. Particularly, it is seen that maximum effective stress occurs in the round portion 113.

Figure 11B:
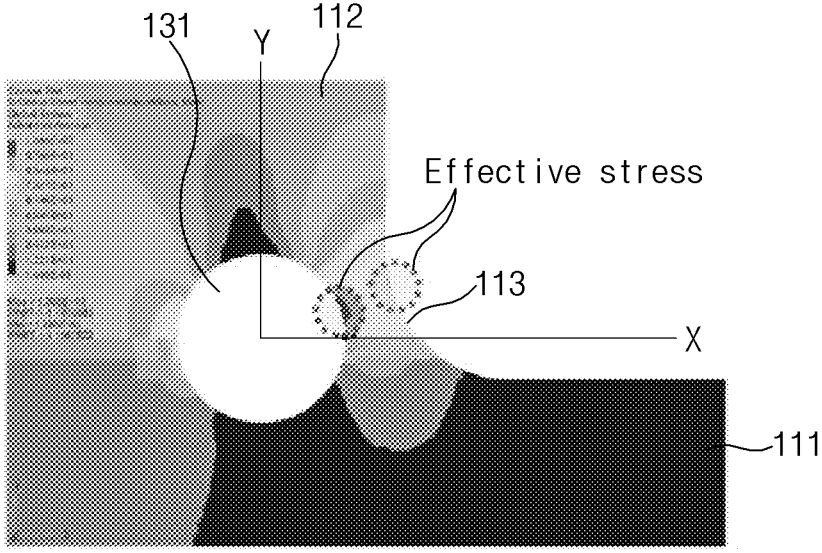
FIG. 11(b) is a second effective stress distribution image and a second effective stress graph illustrating experimental results of Experimental Example 1 according to the present invention.
Figure 11B:
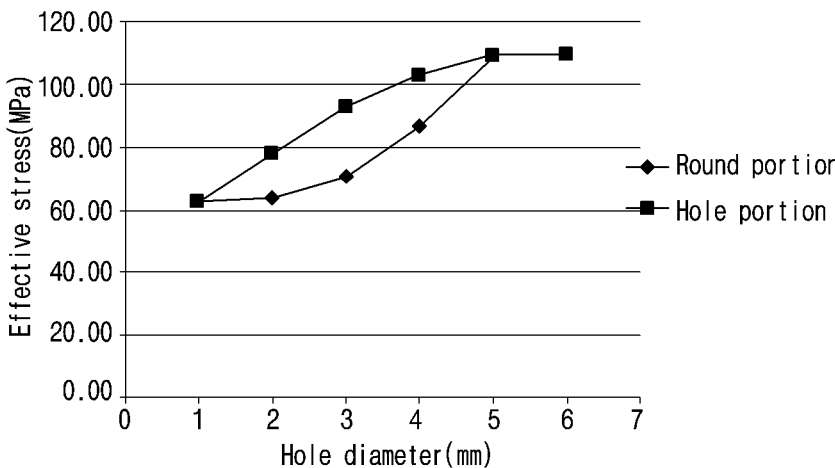

Referring to FIG. 11(b), as a result of applying the tension to the electrode tab 112 of the secondary battery in the Y-axis direction, it is seen that as the diameter of the crack spreading prevention hole 131 increases, the effective stress increases due to a decrease in effective tension area. Particularly, it is seen that maximum stress occurs in the crack spreading prevention hole 131.

Therefore, in Experimental Example 1, when the crack spreading prevention hole 131 is formed to have a diameter of 1 mm to 2 mm, the occurrence of the cracks may be prevented.

Experimental Example 2

A secondary battery comprising an electrode assembly, an electrode lead, and a battery case is prepared. At this time, the electrode assembly comprises an electrode and a separator, the electrode comprises a coating portion and an electrode tab, and the electrode lead is coupled to the electrode tab. Here, a crack spreading prevention hole is provided at an interface between the coating portion and the electrode tab to prevent cracks from being spread.

That is, in Experimental Example 2, a structure, in which an insulating coating layer is excluded from the secondary battery described according to the second embodiment of the present invention, is provided.

At this time, in Experimental Example 2, a plurality of secondary batteries, in which a position of each of crack spreading prevention holes 131 is gradually away from a round portion 113, are prepared to experiment an effective stress generation. As a result, the same results as in FIG. 12 may be obtained.

Experimental Results of Experimental Example 2

Figure 12:
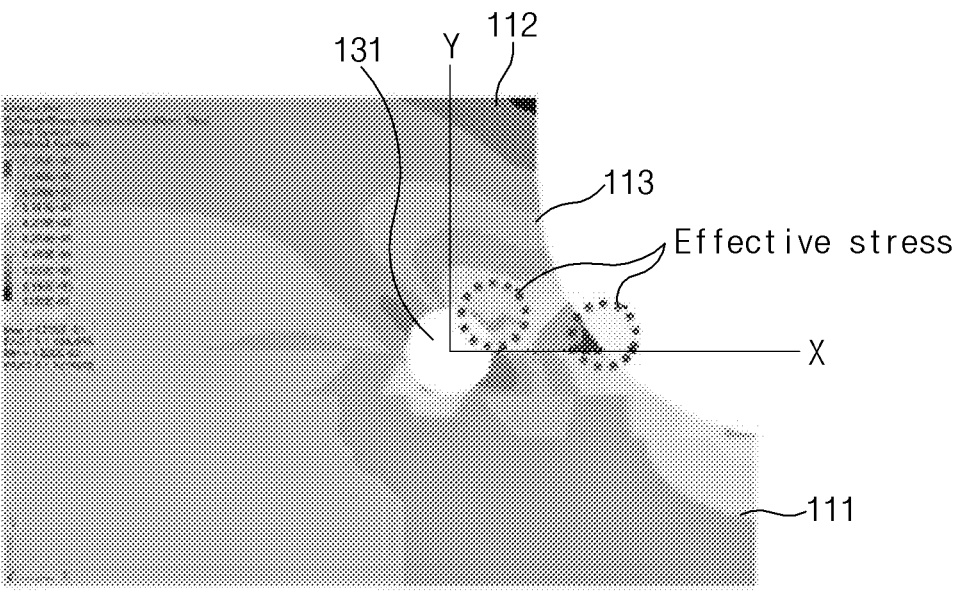
FIG. 12 is an effective stress distribution image and an effective stress graph illustrating experimental results of Experimental Example 2 according to the present invention.
Figure 12:
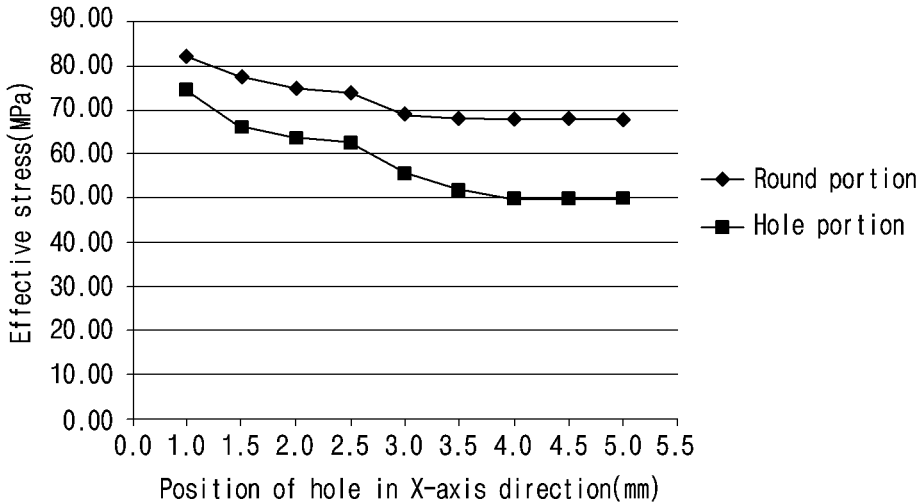

Referring to FIG. 12, in Experimental Example 2, it is seen that the effective stress decreases as the position of the crack spreading prevention hole 131 is further away from the round portion 113. Here, it is seen that the effective stress is not large from a point of 3.5 mm or more.

Therefore, in Experimental Example 2, it is seen that an optimal position of the crack spreading prevention hole is a point that is spaced a distance of 3.5 mm from the round portion.

Experimental Example 3

A secondary battery comprising an electrode assembly, an electrode lead, and a battery case is prepared. At this time, the electrode assembly comprises an electrode and a separator, the electrode comprises a coating portion and an electrode tab, and the electrode lead is coupled to the electrode tab.

Here, in Experimental Example 3, a secondary battery, in which only a crack spreading prevention hole 131 for preventing cracks from being spread is formed in an interface between the coating portion and the electrode tab, and a secondary battery, which comprises the crack spreading prevention hole 131 and an insulating coating layer 132, are prepared. Then, tension is applied to the electrode tab of each of the secondary batteries in an X-axis direction that is a width direction or in a Y-axis direction that is a longitudinal direction to experiment effective stress.

The insulating coating has to be performed using a material that minimizes reaction with an electrolyte inside the secondary battery and is not delaminated from the electrode tab during charging and discharging. As a result, a material basically containing styrene-butadiene rubber (SBR) or ceramic matrix composite (CMC) is used to perform the insulating coating to a thickness of 15 μm. As a result, the same results as in FIGS. 13(a) and 13(b) may be obtained.

Experimental Results of Experimental Example 3

Figure 13A:
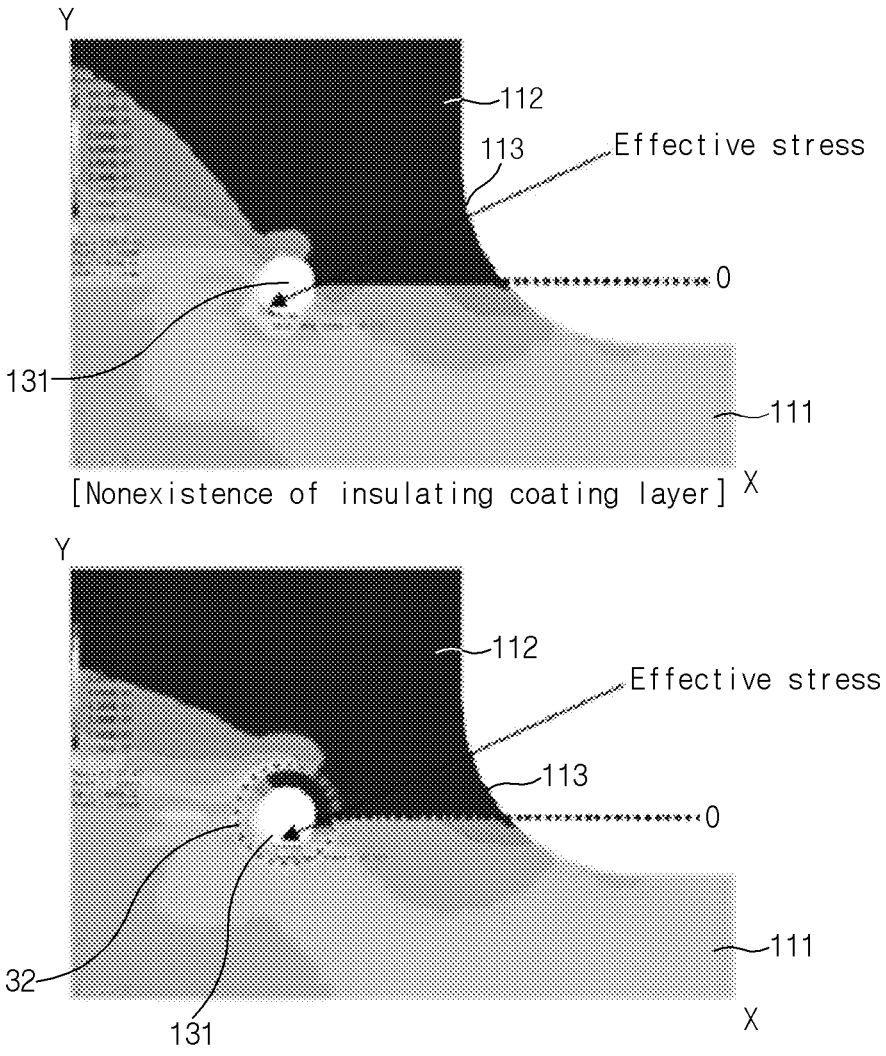
FIG. 13(a) illustrates first effective stress distribution images illustrating experimental results of Experimental Example 3 according to the present invention.
Figure 13B:
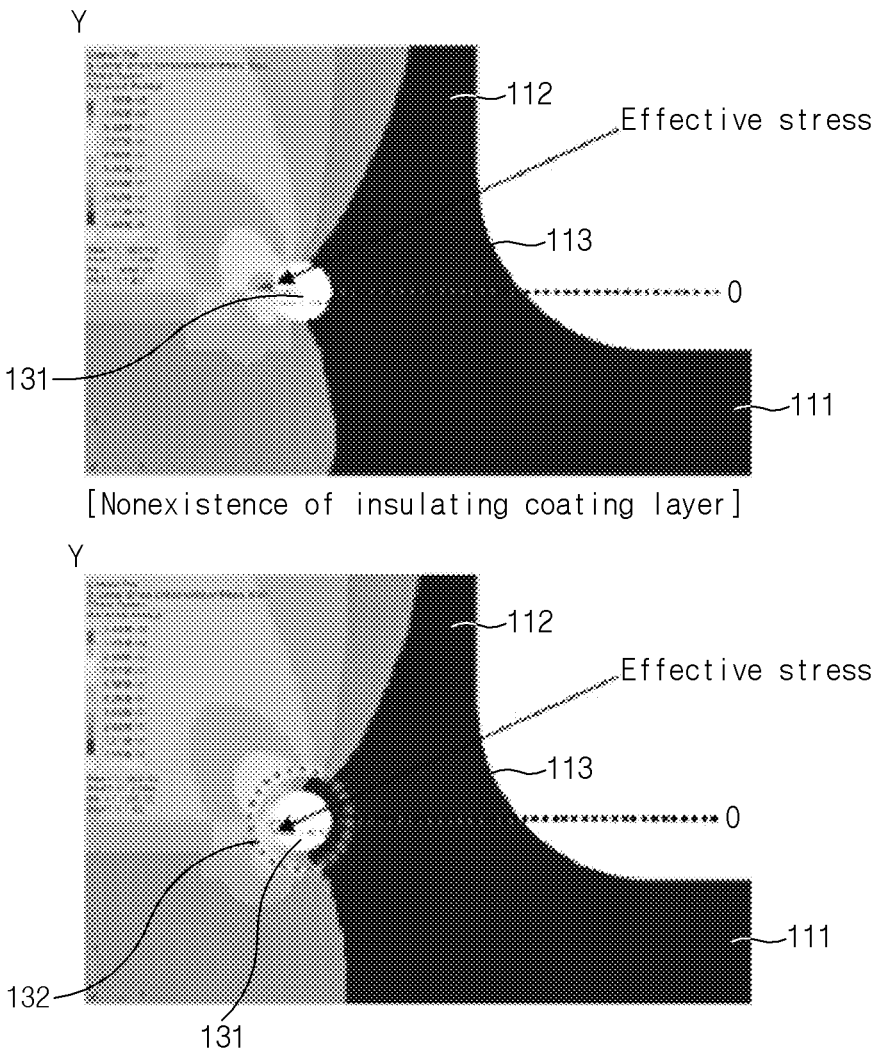
FIG. 13(b) illustrates second effective stress distribution images illustrating experimental results of Experimental Example 3 according to the present invention.

Referring to FIGS. 13(a) and 13(b), it is seen that effective stress is reduced in the secondary battery comprising the insulating coating layer. Here, FIG. 13(a) illustrates a state in which the tension is applied in the X-axis direction, and FIG. 13(b) illustrates a state in which the tension is applied in the Y-axis direction.

That is, there is an effect of reducing the effective stress due to an increase in thickness when the insulating coating layer is generated in the crack spreading prevention hole. That is to say, when the insulating coating layer is applied, it is seen that the effective stress applied to the crack spreading prevention hole decreases by about 10% when the tension is applied in the X-axis direction and decreases by about 21% when the tension is applied in the Y-axis direction.

Therefore, in Experimental Example 3, it is seen that when the insulating coating layer is further provided, the effective stress generated in the electrode tab is reduced, and as a result, the occurrence and spreading of the cracks are prevented.

Experimental Example 4

A secondary battery comprising an electrode assembly, an electrode lead, and a battery case is prepared. At this time, the electrode assembly comprises an electrode and a separator, the electrode comprises a coating portion and an electrode tab, and the electrode lead is coupled to the electrode tab. Here, a crack spreading prevention hole is provided at an interface between the coating portion and the electrode tab to prevent cracks from being spread.

That is, in Experimental Example 4, a structure, in which the insulating coating layer is excluded from the secondary battery described according to the second embodiment of the present invention is provided, but a secondary battery having a circular crack spreading prevention hole and a secondary battery having an elliptical crack spreading prevention hole are prepared. Then, tension is applied to the electrode tab of the secondary battery in the X-axis direction that is the width direction or the Y-axis direction that is the lengthwise direction to experiment a stress generation. As a result, the same results as in FIGS. 14(a) and 14(b) may be obtained.

Experimental Results of Experimental Example 4

Figure 14A:
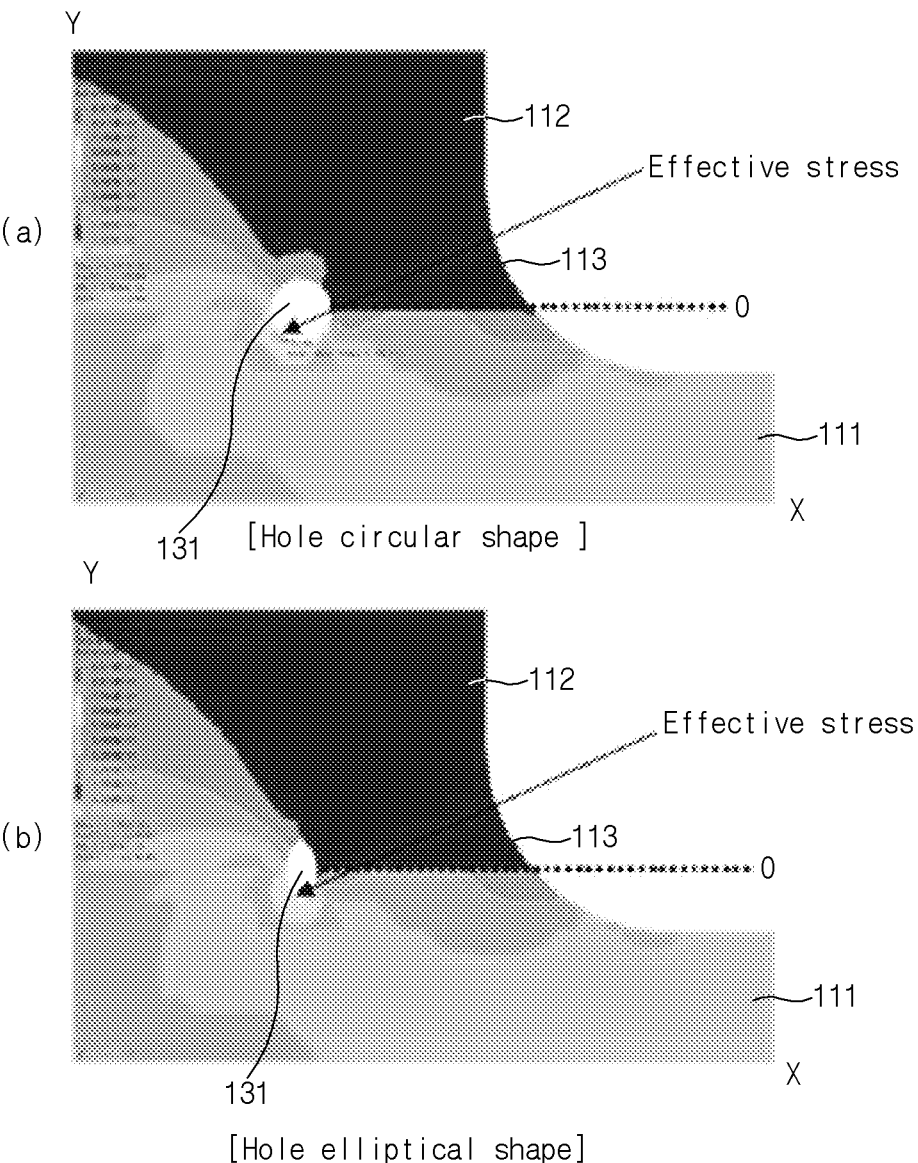
FIG. 14(a) illustrates first effective stress distribution images illustrating experimental results of Experimental Example 4 according to the present invention.
Figure 14B:
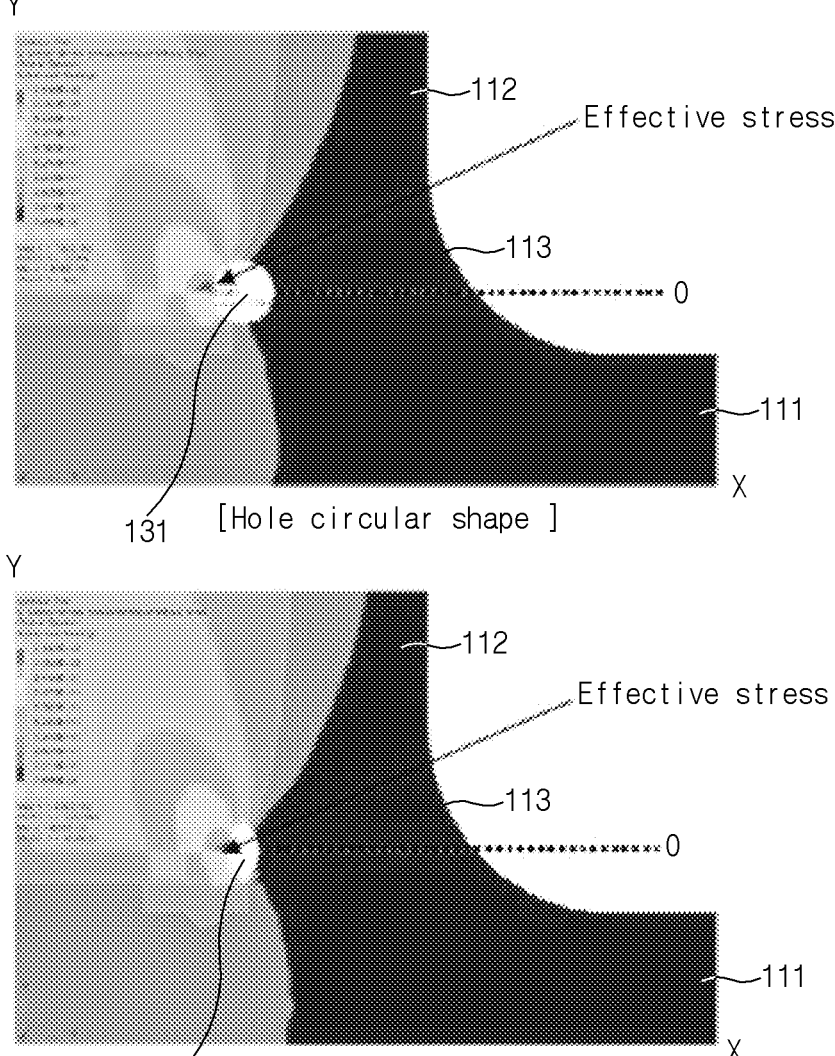
FIG. 14(b) illustrates second effective stress distribution images illustrating experimental results of Experimental Example 4 according to the present invention.

Referring to FIGS. 14(a) and 14(b), it is seen that the effective stress is reduced in the elliptical crack spreading prevention hole when compared to the circular crack spreading prevention hole. Here, FIG. 14(a) illustrates a state in which the tension is applied in the X-axis direction, and FIG. 14(*b*) illustrates a state in which the tension is applied in the Y-axis direction.

That is, it is seen that when the shape is changed from the circular shape to the elliptical shape, there is an effect of reducing the effective stress due to the increase in effective area of the tension. That is to say, when changed to the elliptical shape, it is seen that the effective stress decreases by about 27% when the tension is applied in the X-axis direction and decreases by about 1% when the tension is applied in the Y-axis direction.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

10: Secondary battery
100: Electrode assembly
110: Electrode
111: Coating portion
112: Electrode tab
130: Crack spreading prevention part
131: Crack spreading prevention hole
132: Insulating coating layer
132*a*: Inner coating surface
132*b*: Outer coating surface
133: Reinforcing coating layer
200: Electrode lead
300: Battery case

The invention claimed is:

1. An electrode assembly comprising:
a coating portion coated with an electrode active material, and
an electrode with an electrode tab, the electrode tab not including the electrode active material,
wherein the electrode comprises a crack spreading prevention part, the crack spreading prevention part comprising:

a crack spreading prevention hole formed in the electrode, and
an insulating coating layer provided entirely around a circumferential surface of the crack spreading prevention hole, the insulating coating layer including an outer coating portion provided on top and bottom surfaces of the crack spreading prevention hole, the outer coating portion disposed-above the coating portion and overlapping the coating portion.

2. The electrode assembly of claim 1, wherein the crack spreading prevention hole is formed in an interface between the coating portion and the electrode tab.

3. The electrode assembly of claim 1, wherein the insulating coating layer including an inner coating portion provided on an inner circumferential surface of the crack spreading prevention hole, the outer coating portion being connected to the inner coating portion.

4. The electrode assembly of claim 3, wherein an outer surface of the outer coating portion has a gear shape defined by alternatively provided grooves and protrusions.

5. The electrode assembly of claim 3, wherein the insulating coating layer has a thickness of 10 μm to 15 μm, a thickness of the outer coating portion being greater than a thickness of the inner coating portion.

6. The electrode assembly of claim 1, further including an interface between the coating portion and the electrode tab, the interface including a first end and an opposite second end, a round portion being formed at each of the first and second ends, the crack spreading prevention hole being disposed at a distance of 2.0 mm to 5.0 mm from at least one of the round portions.

7. The electrode assembly of claim 1, wherein the crack spreading prevention part further comprises a reinforcing coating layer disposed on an interface between the coating portion and the electrode tab, the reinforcing coating layer contacting the insulating coating layer.

8. The electrode assembly of claim 1, wherein the crack spreading prevention hole has a circular or elliptical shape with a diameter of 0.5 mm to 2.0 mm.

* * * * *